(12) United States Patent
Roy et al.

(10) Patent No.: US 9,058,070 B2
(45) Date of Patent: Jun. 16, 2015

(54) PREDICTING TIMING VIOLATIONS

(71) Applicant: Utah State University, North Logan, UT (US)

(72) Inventors: Sanghamitra Roy, Logan, UT (US); Koushik Chakraborty, Logan, UT (US)

(73) Assignee: Utah State University, North Logan, UT (US)

( * ) Notice: Subject to any disclaimer, the term of this patent is extended or adjusted under 35 U.S.C. 154(b) by 392 days.

(21) Appl. No.: 13/707,977

(22) Filed: Dec. 7, 2012

(65) Prior Publication Data

US 2013/0326258 A1 Dec. 5, 2013

Related U.S. Application Data (60) Provisional application No. 61/653,159, filed on May 30, 2012.

(51) Int. Cl.
*G06F 1/04* (2006.01)
*G06F 1/28* (2006.01)
*G06F 17/50* (2006.01)
*G06F 11/30* (2006.01)

(52) U.S. Cl.
CPC .. *G06F 1/04* (2013.01); *G06F 1/28* (2013.01); *G06F 17/5031* (2013.01); *G06F 2217/84* (2013.01); *G06F 11/3024* (2013.01); *G06F 11/3058* (2013.01)

(58) Field of Classification Search
CPC .............. G06F 1/10; G06F 1/12; G06F 1/08; G06F 1/04; G06F 1/3202; G06F 1/14; G11C 7/22; H04L 25/14
USPC .................. 713/500, 501, 502, 503
See application file for complete search history.

(56) References Cited

U.S. PATENT DOCUMENTS

| | | | |
|---|---|---|---|
| 4,924,430 A | 5/1990 | Zasio et al. | |
| 5,475,830 A * | 12/1995 | Chen et al. | 716/108 |
| 5,719,783 A | 2/1998 | Kerzman et al. | |
| 5,896,299 A * | 4/1999 | Ginetti et al. | 716/104 |
| 6,681,377 B2 * | 1/2004 | Beletsky | 716/104 |
| 7,487,475 B1 | 2/2009 | Kriplani et al. | |
| 7,808,293 B2 | 10/2010 | Fujisawa | |
| 7,827,454 B2 | 11/2010 | Kurimoto | |
| 8,132,136 B2 | 3/2012 | Bueti et al. | |
| 8,336,012 B2 | 12/2012 | Fry et al. | |
| 2009/0044160 A1 * | 2/2009 | Bueti et al. | 716/6 |
| 2009/0224812 A1 * | 9/2009 | Fujisawa | 327/276 |
| 2009/0235057 A1 * | 9/2009 | Fujisawa | 712/220 |
| 2010/0017567 A1 * | 1/2010 | Fujisawa | 711/124 |
| 2011/0225274 A1 * | 9/2011 | Dvorkin et al. | 709/222 |

* cited by examiner

FOREIGN PATENT DOCUMENTS

| | | | |
|---|---|---|---|
| JP | 10097561 A | 4/1998 | |
| JP | 2006268165 A | 10/2006 | |

OTHER PUBLICATIONS

Sanghamitra Roy, Predicting timing violations through instruction-level path sensitization analysis, Proceedings of the 49th Annual Design Automation Conference, Jun. 3-7, 2012, pp. 1074-1081, Association for Computing Machinery, New York, NY.

*Primary Examiner* — Zahid Choudhury (57) ABSTRACT

For predicting timing violations, a prediction module predicts a timing violation for a first instruction in a semiconductor device in response to use by the first instruction of a specified sensitized path. The prediction module further mitigates the predicted timing violation.

14 Claims, 9 Drawing Sheets

| Instructions 235 | Inputs 240 | Results 245 |
|---|---|---|
| Instructions 235 | Inputs 240 | Results 245 |
| Instructions 235 | Inputs 240 | Results 245 |
| Instructions 235 | Inputs 240 | Results 245 |

| Instructions 255 | Inputs 260 | Results 265 |
|---|---|---|

PREDICTING TIMING VIOLATIONS

CROSS-REFERENCE TO RELATED APPLICATIONS

This application claims priority to U.S. Provisional Patent Application No. 61/653,159 entitled "PREDICTING TIMING VIOLATIONS" and filed on May 30, 2012 for Sanghamitra Roy et al., which is incorporated herein by reference.

FIELD

The subject matter disclosed herein relates to timing violations and more particularly relates to predicting timing violations.

BACKGROUND

Semiconductor circuits may occasionally have timing violations, particularly when there are temperature or voltage stresses.

BRIEF SUMMARY OF THE INVENTION

A method is disclosed for predicting timing violations, a prediction module predicts a timing violation for a first instruction in a semiconductor device in response to use by the first instruction of a specified sensitized path. A violation history table may store the specified sensitized path. The prediction module further mitigates the predicted timing violation. A semiconductor device and an apparatus are also disclosed that perform the functions of the method.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive or mutually inclusive, unless expressly specified otherwise. The terms "a," "an," and "the" also refer to "one or more" unless expressly specified otherwise. In addition, "optional", "optionally", or "or" refer, for example, to instances in which subsequently described circumstance may or may not occur, and include instances in which the circumstance occurs and instances in which the circumstance does not occur.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, or store computer readable program code for use by or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireline, optical fiber, Radio Frequency (RF), or the like, or any suitable combination of the foregoing In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams or schematic block diagrams of methods, apparatuses, systems, and computer program products according to embodiments of the invention. It will be understood that each block of the schematic flowchart diagrams or schematic block diagrams, and combinations of blocks in the schematic flowchart diagrams or schematic block diagrams, can be implemented by computer readable program code. The computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart or block diagram block or blocks.

The schematic flowchart diagrams or schematic block diagrams in the Figures illustrate the architecture, functionality, and operation of possible implementations of apparatuses, systems, methods and computer program products according to various embodiments of the present invention. In this regard, each block in the schematic flowchart diagrams or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams or flowchart diagrams, and combinations of blocks in the block diagrams or flowchart diagrams, can be implemented by special purpose hardware-based systems that perform the specified functions or acts, or combinations of special purpose hardware and computer readable program code.

The description of elements in each figure may refer to elements of proceeding figures. Like numbers refer to like elements in all figures, including alternate embodiments of like elements.

Figure 1:
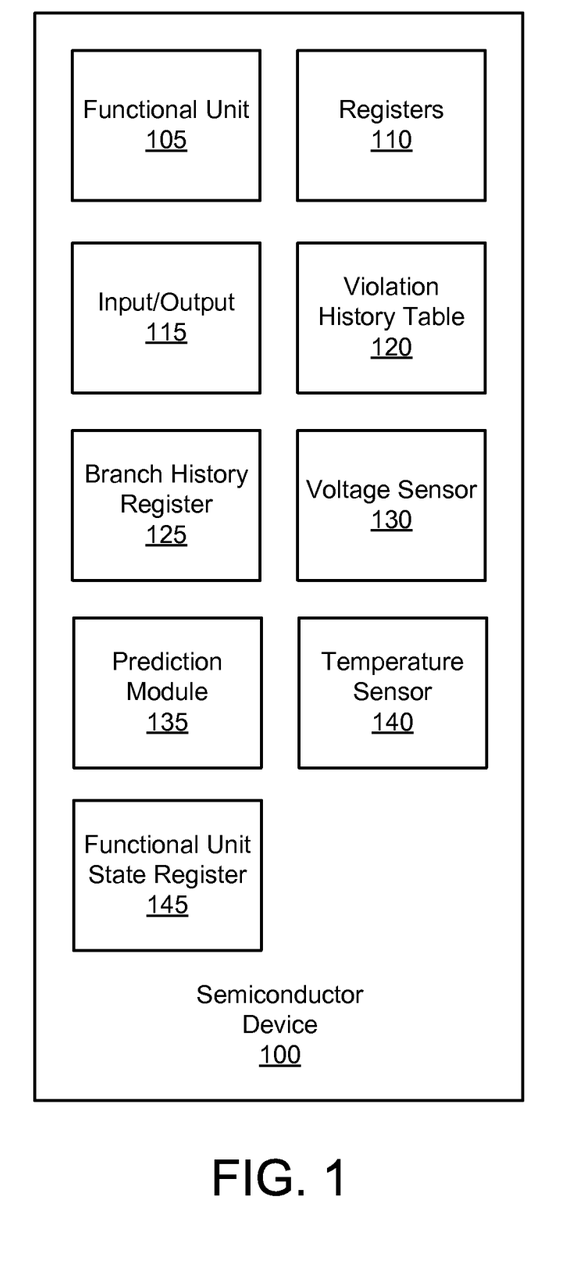
FIG. 1 is a schematic block diagram illustrating one embodiment of a semiconductor device.

FIG. 1 is a schematic block diagram illustrating one embodiment of a semiconductor device 100. The semiconductor device 100 includes a functional unit 105, registers 110, an input/output 115, a violation history table 120, a branch history register 125, a voltage sensor 130, a prediction module 135, a temperature sensor 140, and a functional unit state register 145.

In one embodiment, the semiconductor device 100 is a processor. Alternatively, the semiconductor device 100 may be a graphics accelerator, a memory controller, or the like.

The functional unit 105, registers 110, input/output 115, violation history table 120, branch history register 125, voltage sensor 130, prediction module 135, temperature sensor 140, and functional unit state register 145 may each comprise semiconductor gates, signal lines, resistors, capacitors, power lines, common lines, and the like. The semiconductor gates, signal lines, resistors, capacitors, power lines, common lines and other elements may be organized as into functional nodes. One or more nodes arranged in a path may perform a function. In one embodiment, if the nodes do not complete the function within a specified number of instruction cycles, the timing for the semiconductor device 100 is violated. Violations of timing are referred to herein as timing violations.

The functional unit 105 may be a structural component in a pipelined architecture, including but not limited to, an arithmetic logic unit (ALU), an instruction scheduler, a load address generator, a memory address generator, and forward check logic. The functional unit 105 may perform operations on data in the registers 110. Alternatively, the functional unit 105 may perform operations on addresses, data sets, and the like. In one embodiment, the functional unit 105 performs operations in response to the instructions. In a certain embodiment, at least one instruction is a static instruction.

The input/output 115 may store data to and read data from the registers 110. The violation history table 120 may store one or more sensitized paths associated with a timing violation. Each sensitized path may comprise one or more nodes. Alternatively, the violation history table 120 may store instructions, combinations of instructions, combinations of instructions and inputs, combinations of instructions and results, or combinations of instructions, inputs, and results associated with one or more sensitized paths. For example, a set of first instructions, as well as inputs, or results for the set of first instructions may be stored for a sensitized path that is susceptible to a timing violation. The results may be branch results, conditional results, operation results, or the like. The inputs may include operands, addresses, and the like.

The branch history register 125 may store a history of recent states within the functional unit 105. For example, the branch history register 125 may record the last ten instructions executed by the functional unit 105, along with inputs and results for the instructions.

The voltage sensor 130 may measure voltages within or associated with the semiconductor device 100. In one embodiment, the voltage sensor 130 measures a supply voltage for the semiconductor device 100. The voltage sensor 130 may assert a voltage sensor signal if a voltage falls below a voltage threshold.

The temperature sensor 140 may measure temperatures within or associated with the semiconductor device 100. In one embodiment, the temperature sensor 140 asserts a temperature sensor signal if the temperature exceeds a temperature threshold.

In order to increase the performance of the semiconductor device 100, the timing of signals for paths of the semiconductor device 100 may have tight tolerances. As a result, when some instructions are executed in combination with other recent instructions, inputs, or results along with an elevated temperature or reduced voltage, timing violations may occur. The embodiments described herein predict timing violations before the timing violations occur so that the timing violations may be mitigated. In one embodiment, the prediction module 135 predicts the timing violations.

Figure 2:
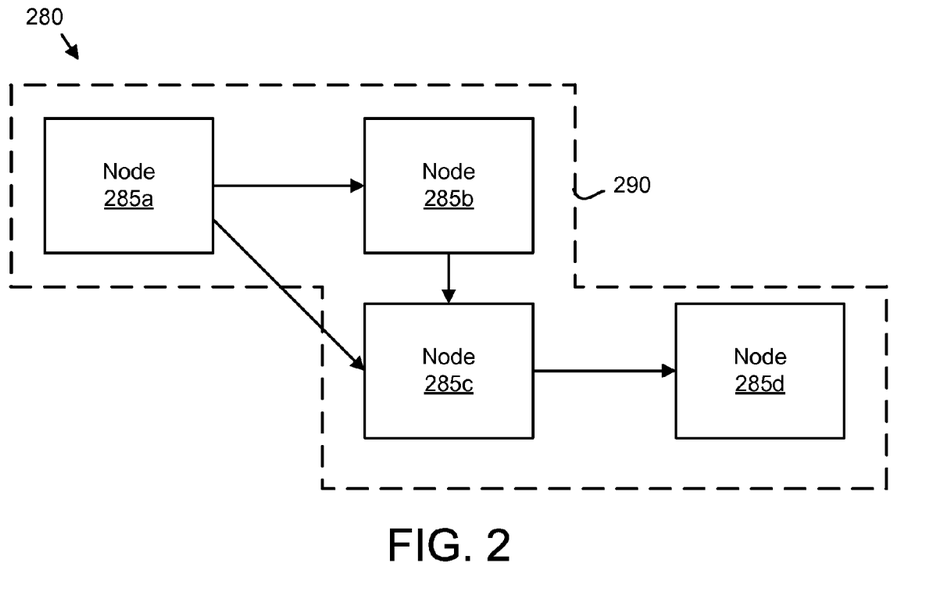
FIG. 2 is a schematic block diagram illustrating one embodiment of nodes and paths.

FIG. 2 is a schematic block diagram illustrating one embodiment of nodes and paths 280. A plurality of nodes 285 is depicted. Results from a first node 285a may be communicated to second node 285b and a third node 285c, with results from the second node communicated to the third node 285c and results from the third node 285c communicated to a fourth node 285d. The nodes 285 may collectively complete an operation or function when a last node 285 such as the fourth node 285d completes that node's portion of the operation. The nodes 285 from the initial first node 285a to the last node 285 form a path 290. A path 290 may have a typical or worst case time interval for completing operations. Paths 290 with typical or worst case time intervals that are substantially similarly to an instruction cycle may be sensitized paths 290.

Figure 3:
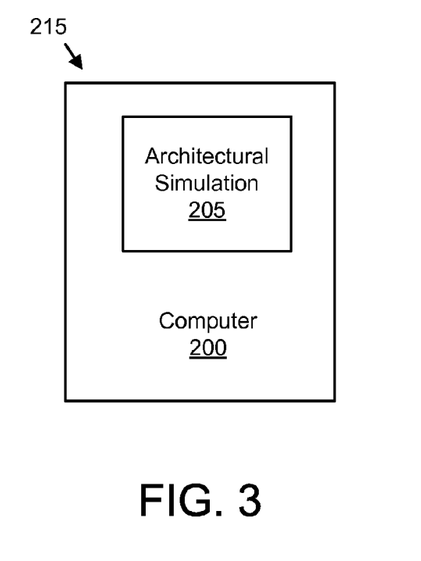
FIG. 3 is a schematic block diagram illustrating one embodiment of a computer and architectural simulation.

FIG. 3 is a schematic block diagram illustrating one embodiment of a computer 200 and architectural simulation 205. The computer 200 may execute the architectural simulation 205.

The computer 200 may include a processor and memory. The memory may be a computer readable storage medium. The memory may comprise semiconductor storage devices, hard disk drives, optical storage devices, micromechanical storage devices, holographic storage devices, or combinations thereof. The memory may store program code that is executed by the processor to perform the architectural simulation 205.

The architectural simulation 205 may be a simulation of the semiconductor device 100. The architectural simulation 205 may be employed to identify nodes 285 and paths 290 of the semiconductor device 100 that are employed for an instruction or combination of instructions. The architectural simulation 205 may simulate propagation delays along signal lines, switching times for gates, transistors, and other circuit elements, reflections, crosstalk, and the like of the nodes 285 and paths 290.

The architectural simulation 205 may determine the time required for each path 290 to complete a function for an instruction or instructions. In one embodiment, the architectural simulation 205 is used to identify sensitized paths 290 in the semiconductor device 100 for one or more instructions as will be described hereafter.

Figure 4:
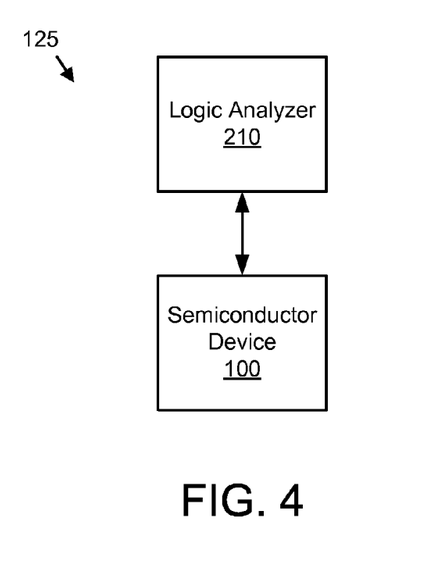
FIG. 4 is a schematic block diagram illustrating one embodiment of a logic analyzer and semiconductor device system.

FIG. 4 is a schematic block diagram illustrating one embodiment of a logic analyzer and semiconductor device system 125. The logic analyzer 210 may be used to capture states of a semiconductor device 100. In one embodiment, the logic analyzer 210 is used to determine frequencies of states, related instructions, and the like as will be discussed hereafter. For example, the logic analyzer 210 may capture a plurality of instructions executed by the semiconductor device 100 while executing program code.

Figure 5:
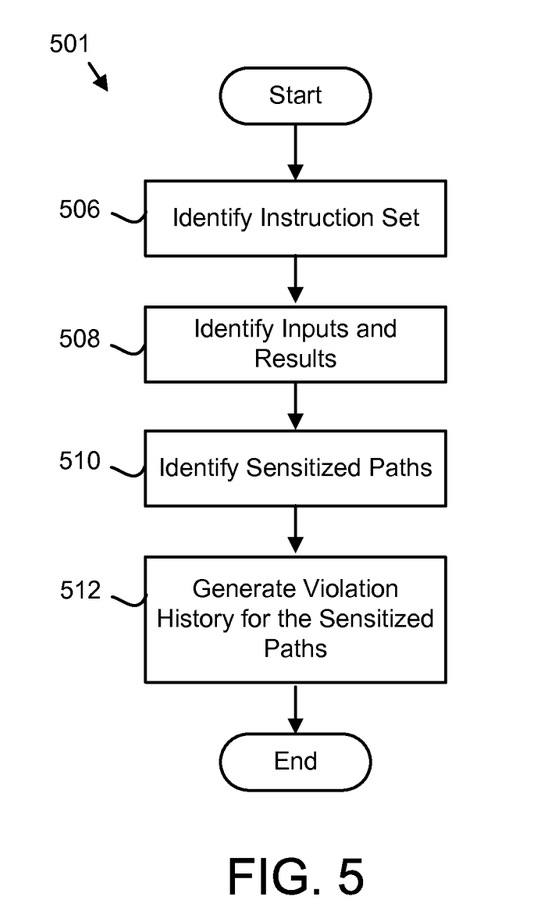
FIG. 5 is a schematic flowchart diagram illustrating one embodiment of a violation history table generation method.

FIG. 5 is a schematic flowchart diagram illustrating one embodiment of a violation history table generation method 501. The method 501 may generate the violation history table 120. The method 501 may be performed by elements of a semiconductor device 100, the architectural simulation 205, the logic analyzer 210, or combinations thereof.

The method 501 starts, and in one embodiment the method 501 identifies 506 an instruction set for the semiconductor device 100. In one embodiment, the instruction set may be the most frequently used instructions from one or more programs. The programs may include but are not limited to benchmark programs, target programs for the semiconductor device 100, and programs designed specifically to stress the semiconductor device 100.

For example, the program may be the SPEC CPU2006 benchmark as defined by the Standard Performance Evaluation Corporation. Alternatively, the program may be a custom program that will be executed by the semiconductor device 100.

The method 501 may further identify 506 the instruction set using the architectural simulator. The architectural simulator 205 may record all instructions or combinations of instructions that are executed. In addition, the architectural simulator 205 may record inputs or results.

Alternatively, the one or more programs may be executed by the semiconductor device 100 and the logic analyzer 210 may record the instructions that are executed. In a certain embodiment, a device that is analogous to the semiconductor device 100 may execute the programs and the logic analyzer 210 may record the instructions that are executed. The logic analyzer 210 may also record inputs or results.

The most frequently executed instructions or combinations of instructions executed by the functional unit 105 may be identified 506 as the instruction set. For example, the 100 most frequently executed combinations of instructions may be selected as the instruction set. Alternatively, the 10,000 most frequently executed combinations of instructions may be selected as the instruction set. In a certain embodiment, the instruction set includes all possible instructions.

The method 501 may further identify 508 inputs or results that are likely to increase the completion time on paths 290 of the functional unit 105. The inputs or results may generate signals that increase crosstalk in a path 290, increase current consumption in the path 290, increase reflections in the path 290, or combinations thereof.

The method 501 may further identify 510 sensitized paths 290 for the instruction set. The sensitized paths 290 may be within a specified timing threshold of exceeding timing tolerances. The timing threshold may be in the range of 0-5% of an instruction cycle. For example, for a timing threshold of 3%, a path 290 may be identified as a sensitized path 290 if the timing for the path 290 is with 2% of the timing for the instruction cycle.

The method 501 may identify 510 paths 290 that complete an operation or function within the timing threshold of an instruction cycle as sensitized paths 290. The operation or function may be in response to instructions, operands, data values, and combinations thereof. In one embodiment, the architectural simulation 205 may be employed to identify 510 the sensitized paths. For example, the architectural simulation 205 may be programmed to identify all paths 290 for the instruction set that where timing exceeds the timing threshold. Alternatively, the logic analyzer 210 may be employed to identify 504 the sensitized paths.

For example, for an instruction cycle of 1,000,000 picoseconds (ps), a path may be identified as a sensitized path 290 for an instruction if the time for the path 290 to complete the instruction is within the timing threshold of 1,000,000 ps. In one embodiment, sensitized paths satisfy Equation 1, where T is the time interval for the path 290, IC is the length of an instruction cycle, and PT is the timing threshold.

$$(|IC-T|/IC) > PT \qquad \text{Equation 1}$$

In one embodiment, the timing threshold PT is between 0-3% of the total available time for the instruction cycle IC. Alternatively, the timing threshold PT is between 0-8% of the total available time for the instruction cycle IC.

The method 501 may further generate 512 the violation history table 120. The violation history table 120 may include all instructions or combinations of instructions, inputs, or results using sensitized paths 290 such that the sensitized paths are within the timing threshold of the total available time for the instruction cycle.

Figure 6:
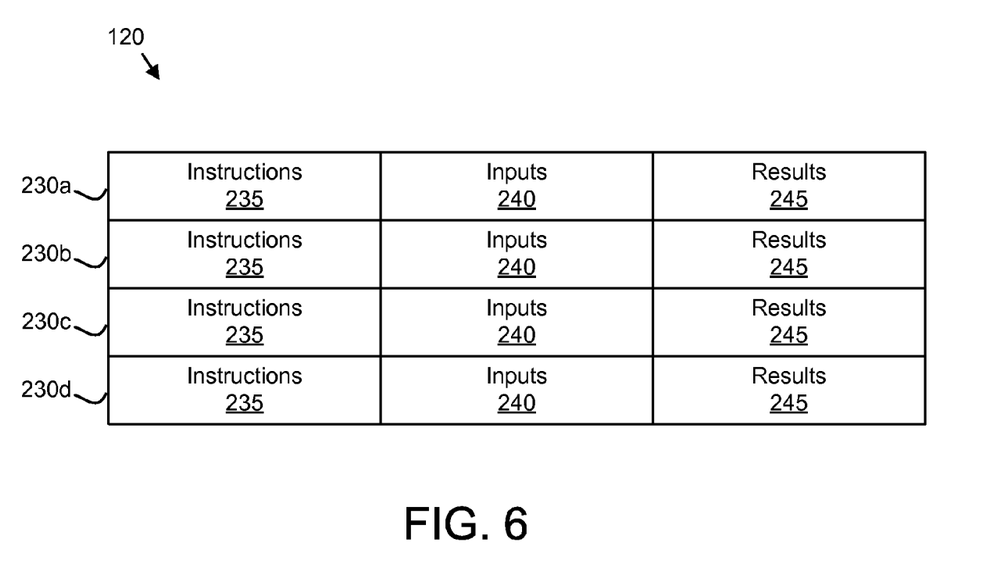
FIG. 6 is a schematic block diagram illustrating one embodiment of a violation history table.

FIG. 6 is a schematic block diagram illustrating one embodiment of a violation history table 120. The violation history table 120 is the violation history table 120 of FIG. 1. In the depicted embodiment, the violation history table 120 includes a plurality of entries 230. Each entry 230 may include one or more instructions 235 that employ the sensitized paths 290.

The instructions 235 may be a series of instructions. Alternatively, the instructions 235 may be a set of instructions that may occur in any order.

In one embodiment, each entry 230 may also include inputs 240. In one embodiment, the inputs 240 must be present for the instructions 235 to be included in the violation history table 120. Alternatively, if the inputs 240 are present, the likelihood of predicting a timing violation is increased while the inputs 240 are not required for the instructions 235 to be included in the violation history table 120.

Each entry 230 may also include results 245. The results 245 may indicate results of the branch instruction, an address generation, a computational result, or combinations thereof. In one embodiment, the results 245 must be present for the instructions 235 to be included in the violation history table 120. Alternatively, the results 245 need not be present. However, the likelihood of predicting a timing violation may be increased if the results 245 are present.

Figure 7:
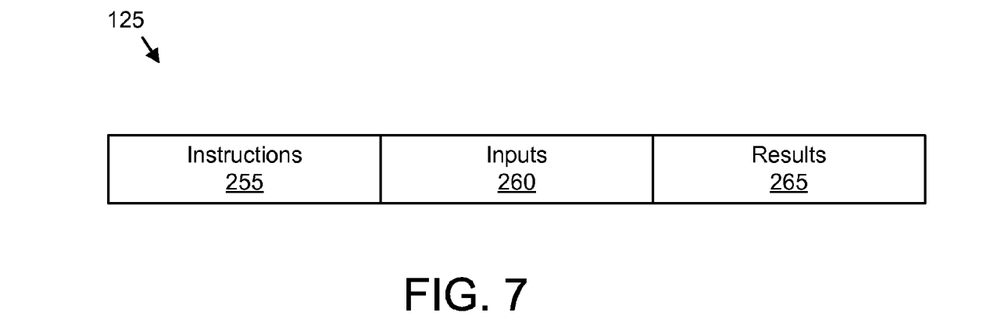
FIG. 7 is a schematic block diagram illustrating one embodiment of a branch history register.

FIG. 7 is a schematic block diagram illustrating one embodiment of a branch history register 125. The branch history register 125 may be the branch history register 125 of FIG. 1. In the depicted embodiment, the branch history register 125 includes one or more instructions 255. The instructions 255 may be one or more instructions in an instruction pipeline. The instructions 255 may be compared with the instructions 235 of the violation history table 120 to determine if an instruction or combination of instructions employ a sensitized path 290 and is likely to cause a timing violation.

In one embodiment, the branch history register 125 also includes inputs 260. The inputs 260 may be inputs for the instructions 255. In a certain embodiment, the branch history register 125 includes results 265. The results 265 may indicate results of the branch instruction, an address generation, a computational result, or combinations thereof.

Figure 8:
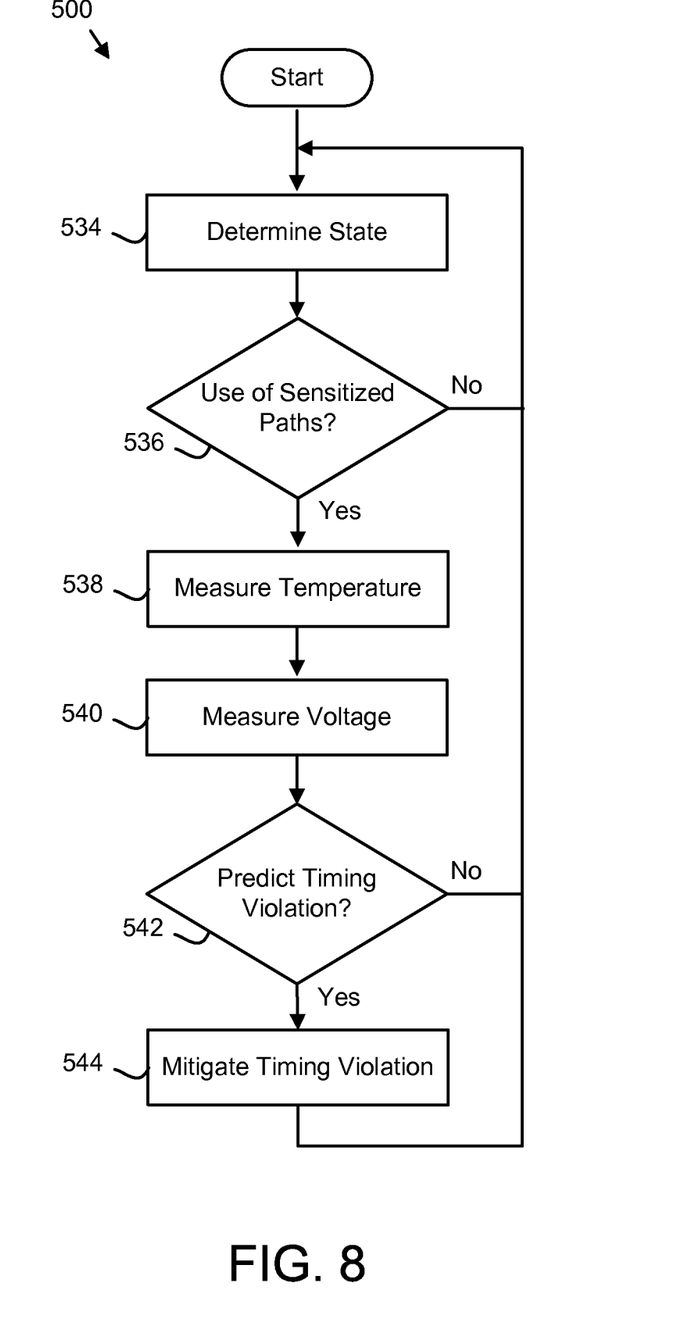
FIG. 8 is a schematic flow chart diagram illustrating one embodiment of a timing violation prediction method.

FIG. 8 is a schematic flow chart diagram illustrating one embodiment of a timing violation prediction method 500. The method 500 may predict future timing violations. The method 500 may be performed by elements of the semiconductor device 100 including but not limited to the violation history table 120, the branch history registers 125, the voltage sensor 130, the prediction module 135, the temperature sensor 140, or the functional unit state register 145.

The method 500 starts, and in one embodiment, the prediction module 135 determines 534 a state. The state may be for the semiconductor device 100. Alternatively, the state may be for the functional unit 105. In one embodiment, the prediction module 135 latches signals from the functional unit 135 or semiconductor device 100 in the branch history register 125 to determine 534 the state.

The prediction module 135 may further determine 536 if the sensitized paths 290 are used by a first instruction. In one embodiment, the sensitized paths 290 are used if the state of the branch history register 125 matches one or more entries 230 in the violation history table 120. For example, the sensitized paths 290 are used if the instructions 255 of the branch history register 125 match the instructions 235 in a specified entry 230 of the violation history table 120.

In one embodiment, the inputs 260 of the branch history table 125 are also evaluated in determining 536 if the sensitized paths 290 are used. For example, the sensitized paths 290 may be used if the instructions 255 of the branch history register 125 match the instructions 235 in a specified first entry 230a of the violation history table 120 and if one or more inputs 260 of the branch history table 125 match one or more inputs 240 of the specified first entry 230a of the violation history table 120.

In addition, the results 265 of the branch history table 125 may be evaluated in determining 536 if the sensitized paths 290 are used. For example, the sensitized paths 290 may be used if the instructions 255 and one or more results 265 of the branch history register 125 match the instructions 235 and one or more results 245 in a specified first entry 230a of the violation history table 120.

If the sensitized paths 290 are not used, the prediction module 135 may continue to determine 534 the state. If the sensitized paths are used, the temperature sensor 140 may measure 538 a temperature within the semiconductor device 100, surrounding devices, or combinations thereof. The temperature sensor 140 may be located within the semiconductor device 100. In addition, the temperature sensor 140 may set a register value, assert a signal line, or combinations thereof when the temperature exceeds a temperature threshold.

In a certain embodiment, the temperature sensor 140 may be located outside of the semiconductor device 100. The temperature sensor 140 may assert a signal to a contact of the semiconductor device 100 when the temperature exceeds the temperature threshold.

In addition, the voltage sensor 130 may measure 540 one or more voltages within or associated with the semiconductor device 100. In one embodiment, the voltage sensor 130 measures 540 a supply voltage for the semiconductor device 100. The voltage sensor 130 may set a register value, assert a signal line, or combinations thereof when the supply voltage falls below a voltage threshold.

In an alternate embodiment, the voltage sensor 130 is located outside of the semiconductor device 100. The voltage sensor 130 may assert a signal to a contact of the semiconductor device 100 when the supply voltage falls below the voltage threshold.

The prediction module 135 may predict 542 a timing violation. In one embodiment, the prediction module 135 predicts 542 the timing violation if the sensitized paths 290 are used. Alternatively, the prediction module 135 predicts 542 the timing violation if the sensitized paths are used and an environmental condition is met. The environmental condition may be met if the temperature exceeds the temperature threshold. In an alternate embodiment, the environmental condition is met if a voltage such as the supply voltage falls below the voltage threshold.

If the prediction module 135 does not predict 542 the timing violation, the prediction module 135 may continue to determine 534 the state. If the prediction module 135 predicts 542 the timing violation, the prediction module 135 may mitigate 544 the timing violation and continue to determine 534 the state.

In one embodiment, the prediction module 135 mitigates 544 the timing violation associated with the first instruction by adding at least one instruction cycle for the first instruction as will be described hereafter. In an alternate embodiment, the prediction module 135 mitigates 544 the timing violation by inserting a stall into one or more instruction pipelines during the execution of the first instruction associated with timing violation. For example, the prediction module 135 may delay all instructions from completing for one instruction cycle while the first instruction executes.

Alternatively, the prediction module 135 may mitigate 544 the timing violation with time borrowing. For example, buffers may be added to a clock signal for one or more latches for the outcome of the first instruction so that the outcome is latched later, mitigating the timing violation.

Alternatively, the prediction module 135 may mitigate 544 the timing violation by identifying the first instruction associated with the timing violation. The prediction module 135 may set a bit to indicate the predicted timing failure for the first instruction. The functional unit state register 145 may track whether the functional unit 105 can receive the first instruction. The functional unit state register 145 may prevent the functional unit 105 from completing the first instruction for an instruction cycle in response to the first instruction being identified as having a predicted timing failure.

In one embodiment, the prediction module 135 may mitigate 544 the timing violation by delaying a tag broadcast for an instruction pipeline for at least one instruction cycle in response to predicting the timing failure. Tags may be used to synchronize one or more instruction pipelines. Delaying a tag broadcast may delay the completion of the first instruction 410a associated with the predicted timing violation.

In a certain embodiment, the prediction module 135 mitigates 544 the timing violation by scheduling the first instruction associated with the timing violation earlier. For example, the prediction module 135 may schedule the first instruction to start earlier in the instruction pipeline relative to other instructions.

By predicting timing violations, the method 500 may anticipate and mitigate the timing violations, eliminating the need for a time-consuming error recovery. Thus average instruction cycles for the semiconductor device 100 may be shortened as potential timing violations are predicted and mitigated.

Figure 9A:
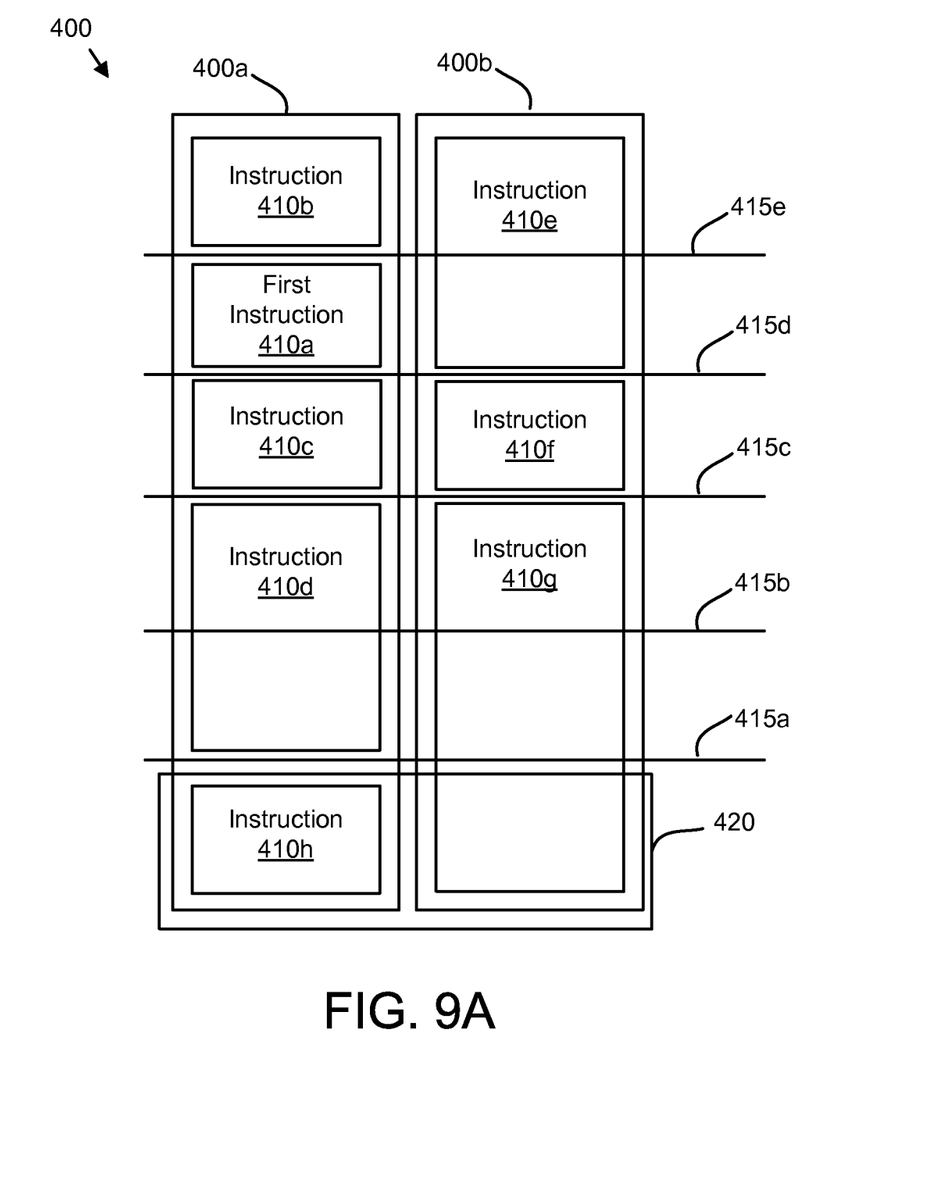
FIGS. 9A-C are schematic block diagrams illustrating one embodiment of mitigating a predicted timing violation.
Figure 9B:
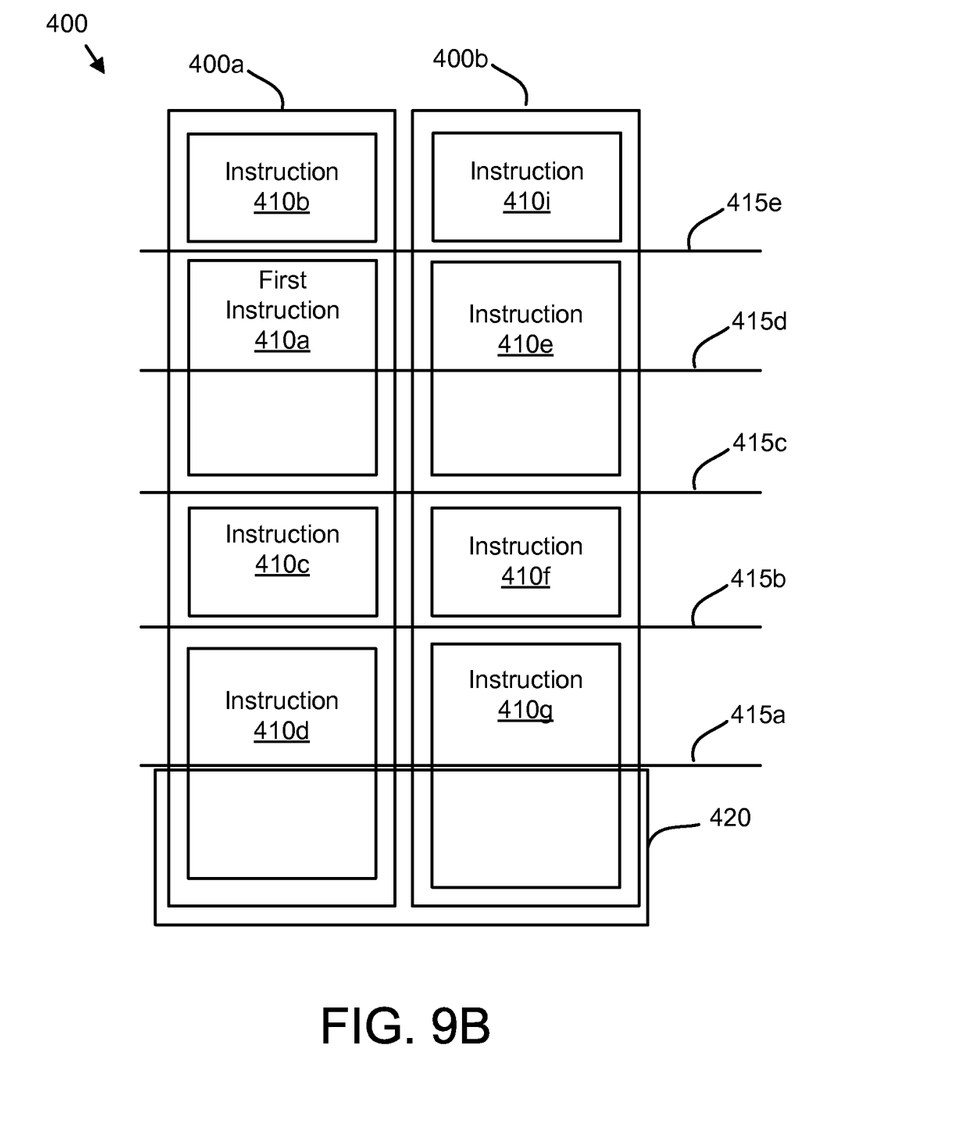
Figure 9C:
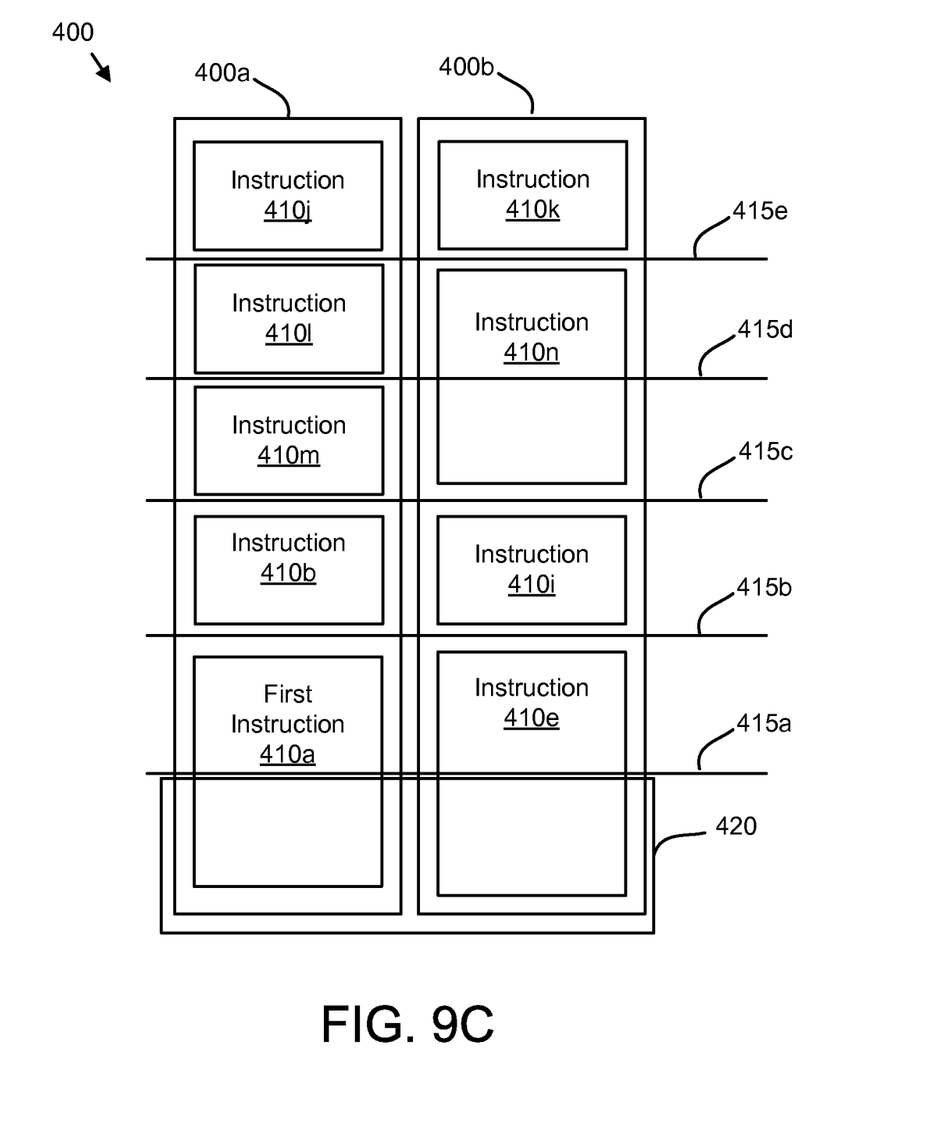

FIGS. 9A-C are schematic block diagrams illustrating one embodiment of mitigating a predicted timing violation. Instruction pipelines 400 are shown. Although for simplicity two instruction pipelines 400 are depicted, any number of instruction pipelines 400 may be employed. The instruction pipelines 400 may be embodied in the functional unit 105.

Each instruction pipelines 400 includes one or more instructions 410 organized an execution order. The instruction pipelines 400 are depicted as divided by instruction cycles 415. One of skill in the art will recognize that the instruction pipelines 400 need not be divided by instruction cycle 415. Instructions 410 may require one or more instruction cycles 415 to execute. The instruction pipelines 400 include program counters 420. The program counters 420 indicate the instruction 410 that is currently completing. Portions of instructions 410 may be executed throughout the instruction pipeline 400.

In FIG. 9A, the first instruction 410a is identified as having a predicted timing violation. The predicted timing violation will be mitigated as will be shown hereafter. In FIG. 9B, the timing violation is mitigated by adding one instruction cycle for the first instruction 410a. Thus when the first instruction 410a executes has shown in FIG. 9C, the first instruction 410a will have an additional instruction cycle 415 to complete rather than the one instruction cycle 415 as originally scheduled in FIG. 9A. In certain embodiments, two or more instruction cycles 415 may be added to the first instruction 410a to mitigate the predicted timing violation.

Figure 10:
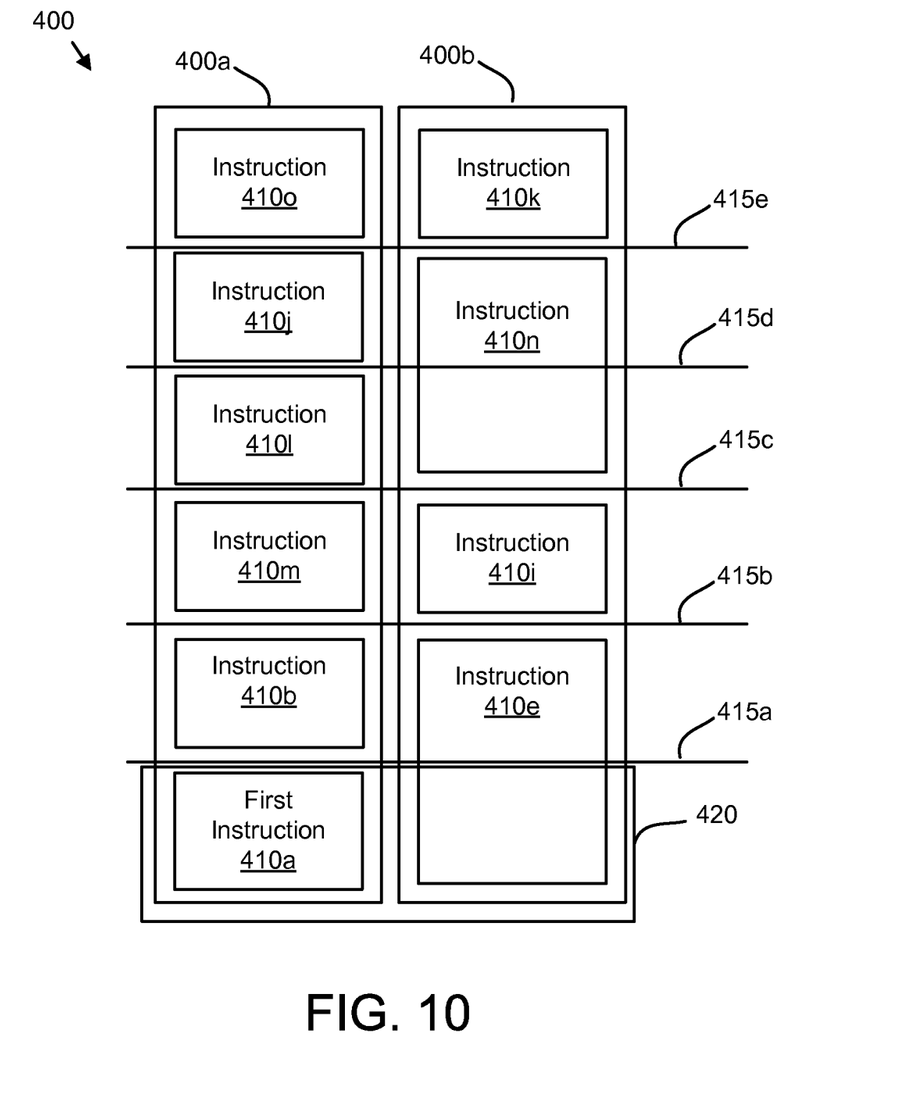
FIG. 10 is a schematic block diagram illustrating one alternate embodiment of mitigating a predicted timing violation.

FIG. 10 is a schematic block diagram illustrating one alternate embodiment of mitigating a predicted timing violation. The first instruction 410a associated with the timing violation of FIG. 9A is shown being executed. In order to mitigate the timing violation, at least a first instruction pipeline 400a is stalled so the first instruction 410a has additional time to complete. The instruction pipelines 400 may be stalled by pausing an instruction clock. In a certain embodiment, only one instruction pipeline 400 such as the first instruction pipeline 400a is stalled. Instruction pipeline 400 may be stalled for one or more instruction cycles 415. Alternatively, the instruction pipeline 400 may be stalled for a portion of an instruction cycle 415.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
generating, using semiconductors, a violation history table for a specified sensitized path, wherein the violation history table comprises a first instruction that employs the sensitized path;
predicting a timing violation for the first instruction in a semiconductor device in response to an environmental condition and to use by the first instruction of the specified sensitized path, wherein the first instruction is identified as having the predicted timing violation with a set register value;
tracking with a functional unit state register whether a functional unit can receive the first instruction; and
mitigating the predicted timing violation by one of inserting a stall in an instruction pipeline, scheduling the first instruction earlier in the instruction pipeline, and preventing the functional unit from executing the first instruction in response to the first instruction being identified as having the predicted timing violation.

2. The method of claim 1, wherein the environmental condition comprises a supply voltage falling below a voltage threshold.

3. The method of claim 1, wherein the environmental condition comprises a temperature exceeding a temperature threshold.

4. The method of claim 1, wherein the sensitized path is identified for a specified instruction set of a functional unit selected from the group consisting of an arithmetic logic unit (ALU), an instruction scheduler, a load address generator, a memory address generator, and forward check logic.

5. The method of claim 4, wherein benchmark instructions that are most frequently executed by the functional unit are selected as the specified instruction set.

6. The method of claim 4, wherein the sensitized path is selected from an architectural simulation of the specified instruction set.

7. The method of claim 1, wherein the timing violation is further mitigated by adding at least one instruction cycle for the first instruction.

8. The method of claim 7, further comprising delaying a tag broadcast for the at least one instruction cycle in response to predicting the timing failure.

9. A semiconductor device comprising:
a violation history table storing a specified sensitized path, wherein the violation history table comprises a first instruction that employs the sensitized path; and
a prediction module predicting a timing violation for the first instruction in response to an environmental condition and to use by the first instruction of the specified sensitized path, wherein the first instruction is identified as having the predicted timing violation with a set register value, tracking with a functional unit state register whether a functional unit can receive the first instruction, and mitigating the predicted timing violation by one of inserting a stall in an instruction pipeline, scheduling the first instruction earlier in the instruction pipeline, and preventing the functional unit from executing the first instruction in response to the first instruction being indentified as having the predicted timing violation.

10. The semiconductor device of claim 9, wherein the environmental condition comprises a supply voltage falling below a voltage threshold.

11. The semiconductor device of claim 9, wherein the environmental condition comprises a temperature exceeding a temperature threshold.

12. The semiconductor device of claim 9, wherein the sensitized path is identified for a specified instruction set of a functional unit selected from the group consisting of an arithmetic logic unit (ALU), an instruction scheduler, a load address generator, a memory address generator, and forward check logic.

13. The semiconductor device of claim 9, wherein the timing violation is further mitigated by adding at least one instruction cycle for the first instruction.

14. An apparatus comprising:
a violation history table storing a specified sensitized path, wherein the violation history table comprises a first instruction that employs the sensitized path;
a prediction module predicting a timing violation for the first instruction in a semiconductor device in response to a environmental condition and to use by the first instruction of a specified sensitized path, wherein the first instruction is identified as having the predicted timing violation with a set register value, tracking with a functional unit state register whether a functional unit can receive the first instruction; and the prediction module mitigating the predicted timing violation by one of inserting a stall in an instruction pipeline, scheduling the first instruction earlier in the instruction pipeline, and preventing the functional unit from executing the first instruction in response to the first instruction being identified as having the predicted timing violation.

* * * * *